United States Patent [19]

Yamagguchi

[11] Patent Number: 5,220,431

[45] Date of Patent: Jun. 15, 1993

[54] IMAGE-FORMING APPARATUS HAVING A LANDSCAPE MODE AND A PORTRAIL MODE

[75] Inventor: Ikunori Yamagguchi, Toyokawa, Japan

[73] Assignee: Minolta Camera Kabushiki Kaisha, Osaka, Japan

[21] Appl. No.: 687,677

[22] Filed: Apr. 19, 1991

[30] Foreign Application Priority Data

Apr. 21, 1990 [JP] Japan .................. 2-105644
Apr. 21, 1990 [JP] Japan .................. 2-105645

[51] Int. Cl.⁵ .......................... H04N 1/21; G06F 7/00
[52] U.S. Cl. ..................... 358/296; 358/449; 395/116; 395/117
[58] Field of Search ............. 358/296, 444, 449; 395/115, 116, 117

[56] References Cited

U.S. PATENT DOCUMENTS

| | | | |
|---|---|---|---|
| 4,716,544 | 12/1987 | Bartley | 364/900 |
| 4,814,894 | 3/1989 | Yoshida | 358/449 X |
| 4,837,709 | 6/1989 | Sasaki | 395/115 X |
| 4,843,405 | 7/1989 | Morikawa et al. | 346/1.1 |
| 4,952,948 | 8/1990 | Suzuki et al. | 346/150 |
| 5,038,218 | 8/1991 | Matsumoto | 358/444 X |
| 5,072,311 | 12/1991 | Hiramatsu et al. | 358/449 X |
| 5,084,831 | 1/1992 | Morikawa et al. | 395/116 |

FOREIGN PATENT DOCUMENTS

| | | | |
|---|---|---|---|
| 59-37763 | 3/1984 | Japan | 358/449 |
| 60-61448 | 4/1985 | Japan | 358/449 |
| 60-74769 | 4/1985 | Japan | 358/449 |

Primary Examiner—Benjamin R. Fuller
Assistant Examiner—Eric Frahm
Attorney, Agent, or Firm—Burns, Doane, Swecker & Mathis

[57] ABSTRACT

In a printer, when image data is received from a host, the width of the image is compared with the width of a sheet of paper set in the printer. In another printer, the width of image received from the host is compared with the maximum width in which the printer can print an image. In both cases, if the former width is larger than the latter width the image data is written in a memory by rotating the image automatically by 90°. Then, the image data stored in the memory is printed on a paper.

30 Claims, 17 Drawing Sheets

IMAGE-FORMING APPARATUS HAVING A LANDSCAPE MODE AND A PORTRAIL MODE

BACKGROUND OF THE INVENTION

1. Field of the Invention

The present invention relates to an image-forming apparatus such as a dot printer.

2. Description of the Related Art

A format is set at first by a user when an image is printed on a paper. At this time, paper size, print width, margin, pitch of line feed or the like is set according to the purpose of the printing. If the user does not set a format, a predetermined standard format is set as the default format.

A dot printer is available which has a key or mode for designating portrait printing, wherein an image as received is printed, and landscape printing, wherein an image received is rotated by 90° with respect to a sheet of paper. The angle of font and the direction of printing can be changed according to the designated key or mode.

If an image data having a width larger than the maximum width in which an image can be printed by a printer, for example 8.5 inches for letter size, is received, the landscape printing may be designated. According to the designation of landscape printing, the image received from a host is stored in a memory as a portrait image by editing the received image so as to be rotated by 90° with respect to a sheet of paper, and the direction of printing is also changed. Thus, an image having a width larger than the maximum width can be printed with the same printer.

However, dot printers which do not have a function or a command for designating landscape printing are also available.

In such a dot printer, in the emulation mode wherein an application program for other dot printers is run, an image generated by the application program is printed. However, an application program wherein an image having a width larger than the maximum width allowed by the dot printer cannot by used.

In such a case, a command for designating landscape printing may be added in the application program. However, if the application program does not process the command, a user is required to send the command from the host before sending the image data. Therefore, it is not so easy for a user to use such a command.

Further, even if the width of image data received from a host is the maximum width or less, printing is not possible when the papers to be set in a cassette of the printer at present have a width smaller than the width of received image. If a user decides erroneously that the image can be printed in portrait mode, printing is not possible.

SUMMARY OF THE INVENTION

It is an object of the present invention to provide an image-forming apparatus wherein landscape printing is conducted when the area of image data received from a host has a width larger than the maximum width in which an image can be printed by the printer.

It is another object of the present invention to provide an image forming apparatus wherein landscape printing is possible when the area of image data received from a host has a width larger than the width of papers set at present in a cassette of the printer.

An apparatus according to the present invention for forming an image according to image data received from the external, includes memory means for storing a page of image data; first write means for writing the image data received from the external in the memory means so that the direction of an image to be stored in the memory means agrees with that of an image to be received from the external; and second write means for writing the image data received from the external in the memory means so that the direction of an image to be stored in the memory means is different from, for example, perpendicular to that of an image received from the external; and if the width of an image received from a host is larger than a predetermined width, an image is formed automatically on a sheet of paper according to the image data written by the second write means. The predetermined width is, for example, the maximum width in which an image can be formed with the apparatus, or the width of a sheet of paper on which the image is to be printed.

It is an advantage of the present invention that an image can be formed on a sheet of paper even if the area of image data received from a host has a width larger than the width of the maximum width of printing or the width of the sheets of papers set in a cassette.

DESCRIPTION OF THE DRAWINGS

Further objects and advantages of the present invention will become apparent from the detailed explanation of embodiments thereof with reference to the accompanying drawings, in which.

DETAILED DESCRIPTION OF THE PREFERRED EMBODIMENT

Figure 1:
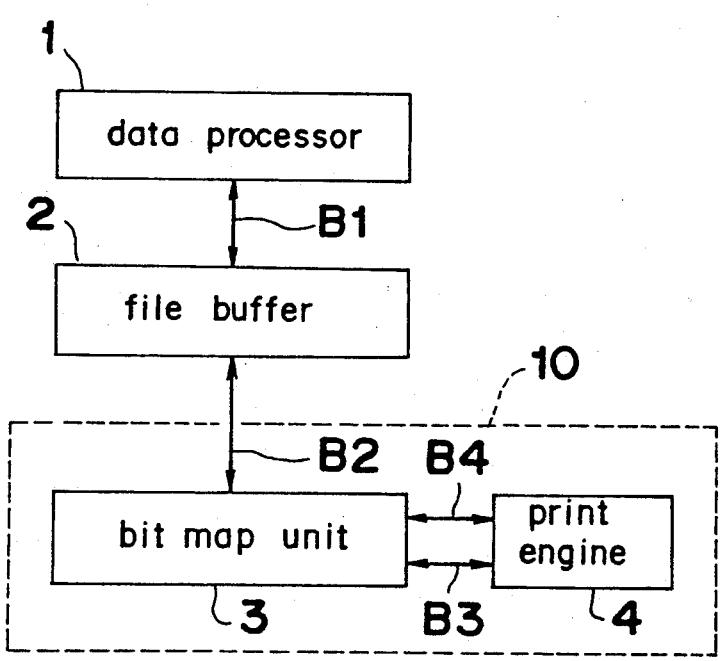
FIG. 1 is a block diagram of a printer system.

Embodiments of the present invention will be explained below in the following order:

(a) the structure of an electrophotographic printer (a - 1) the entire structure (a - 2) the structure of bit map controller (a - 3) the structure of bit map writer (b) emulation mode and bit map control (c) image area and landscape designation function (d) flow of bit map control (d - 1) start process (d - 2) scheduler (d - 3) user process (d - 4) host process (e) modified embodiment Referring now to the drawings, wherein like reference characters designate like or corresponding parts throughout the views, preferred embodiments of the present invention will be explained below.

(a) the structure of electrophotographic printer (a - 1) the entire structure

First, the general structure of printer and print controller is explained below.

FIG. 1 shows the structure of a printer system 10 of an embodiment wherein a graphic image can be printed. Data sent from a host (data processor) 1 such as a computer are stored first in a file buffer 2 in order to improve the throughput of the host 1, and then the data are sent to the printer system 10. The printer system 10 comprises a bit map unit 3 for processing the data and a print engine 4 with use of electrophotographic process and a laser optical system.

Figure 2:
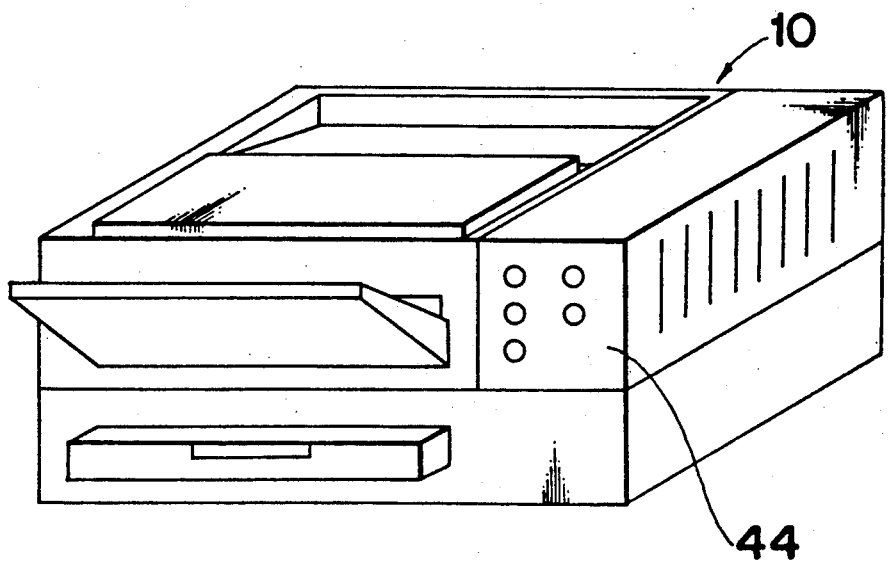
FIG. 2 is a perspective view of a printer.

FIG. 2 shows the perspective view of the printer system 10 having the bit map unit 3, the print engine 4 has a display panel 44 having display devices for showing the status of the printer system 10.

Figure 3:
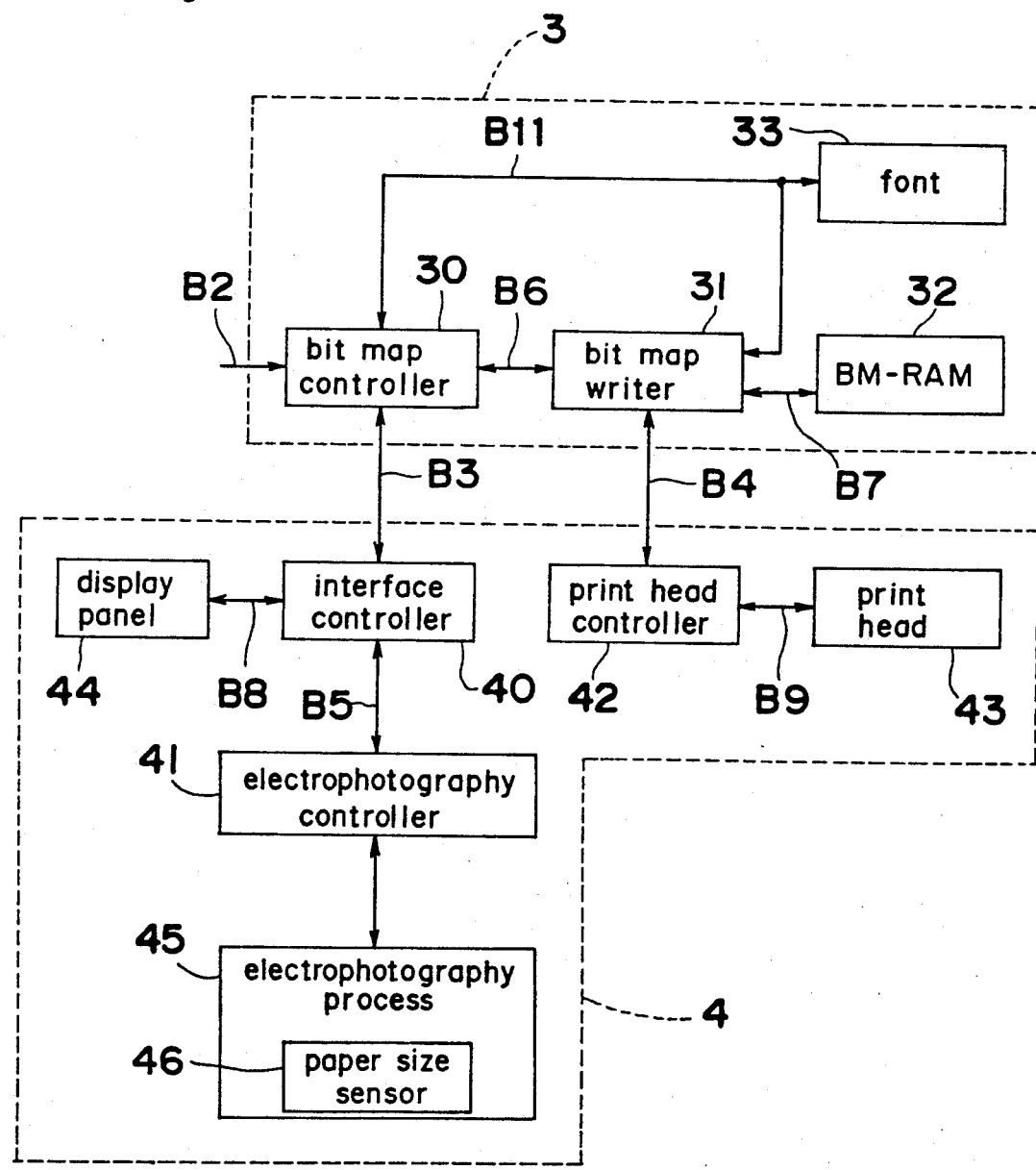
FIG. 3 is a block diagram of a control system of the printer system.

FIG. 3 shows a general block diagram of the control system of the printer system 10. The bit map unit 3 for processing received data in a memory includes a bit map controller 30 (refer FIG. 4), a bit map memory (BM-RAM) 32, a bit map writer 31 (refer FIG. 5) for writing an image in the bit map memory 32 and a font part 33. The bit map unit 3 is connected to the print engine 4 through a bus B3 for control data including sheet number, accessary and through a bus B4 for image data.

The print engine 4 includes three controllers 40, 41 and 42. An interface controller 40 processes the control data received from the bit map controller 30, the control of the display panel 44 and the timings of the entire print engine 4. An electrophotography controller 41 controls an electrophotography process part 45 according to the data sent through the internal bus B5 from the interface controller 40. A print head controller 42 controls the light-emitting of a semiconductor laser and the rotation of a polygon motor of a print head 43.

The size of papers set in a cassette of the print system 10 is detected with a conventional sensor 46. For example, a code expressing paper size is put on a cassette, and the sensor 46 detects the code, but detailed explanation is omitted here.

(a - 2) the structure of bit map controller

Figure 4:
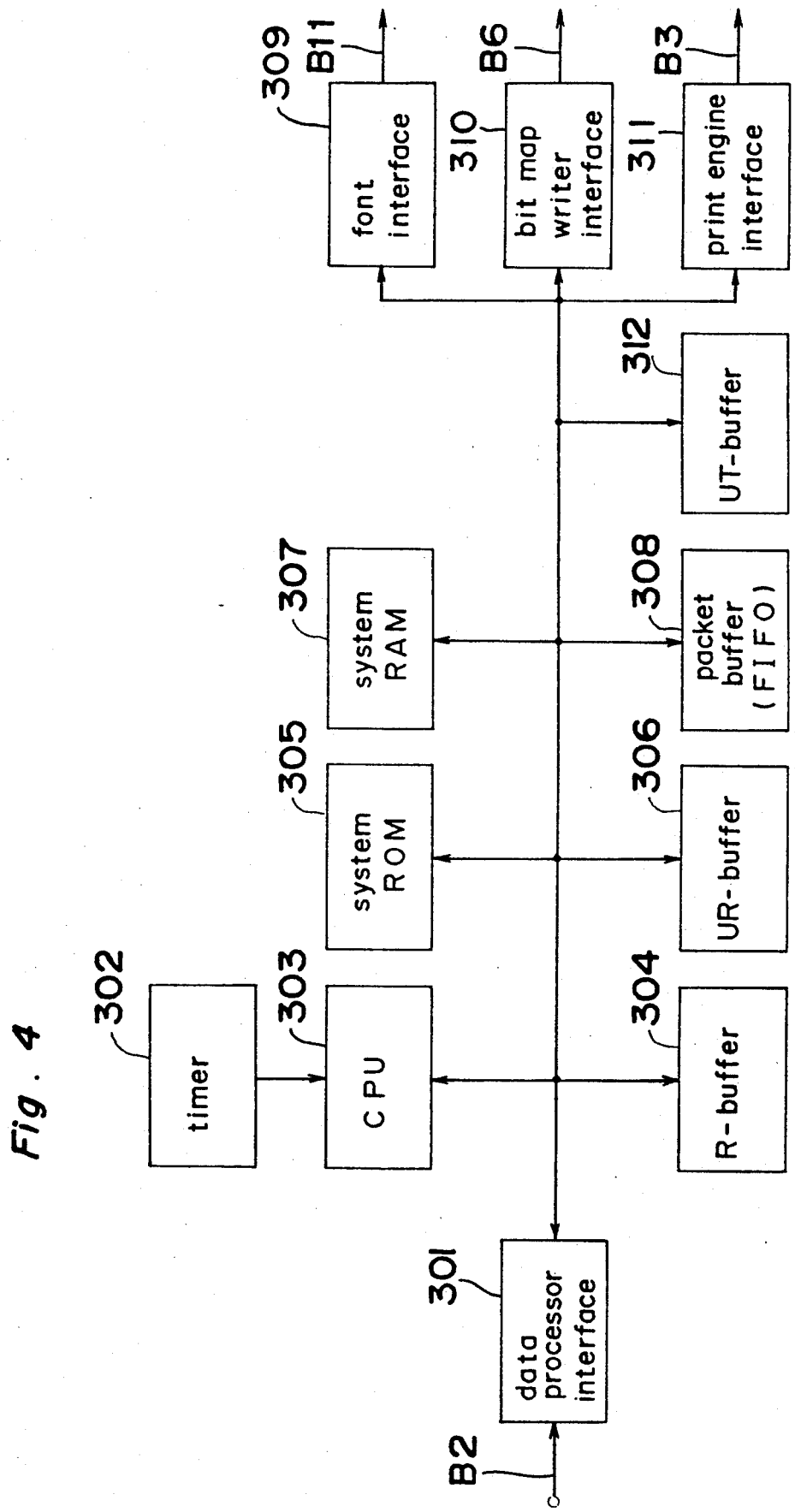
FIG. 4 is a block diagram of a bit map controller.

FIG. 4 show the structure of the bit map controller 30 comprising interfaces 301, 309, 310 and 311 for data input and output, a CPU 303 as a core of the bit map controller 30, a system ROM 305, a system RAM 307, a timer 302 for periodic interrupt of the CPU 303 and buffer memories 304, 306, 308 and 312 for storing data.

An R-buffer 304 stores received data inputted through the data processor interface 301 from a host, a UR-buffer 306 stores data converted to the protocol of this printer from the data of the protocol of another printer used for a user process which will be explained below. A UT-buffer 312 is used to store the size of papers set in a cassette of the printer at present. The system RAM 307 has a download area of a user process. A packet buffer 308 is a first-in first-out (FIFO) memory for storing packets which are intermediate data obtained by converting the data stored in the R-buffer 304 or the UR-buffer 306. The CPU 305 can process a host process and a packet process stored in the system ROM 303, and a user process stored in the system RAM 307.

(a - 3) the structure of bit map writer

Figure 5:
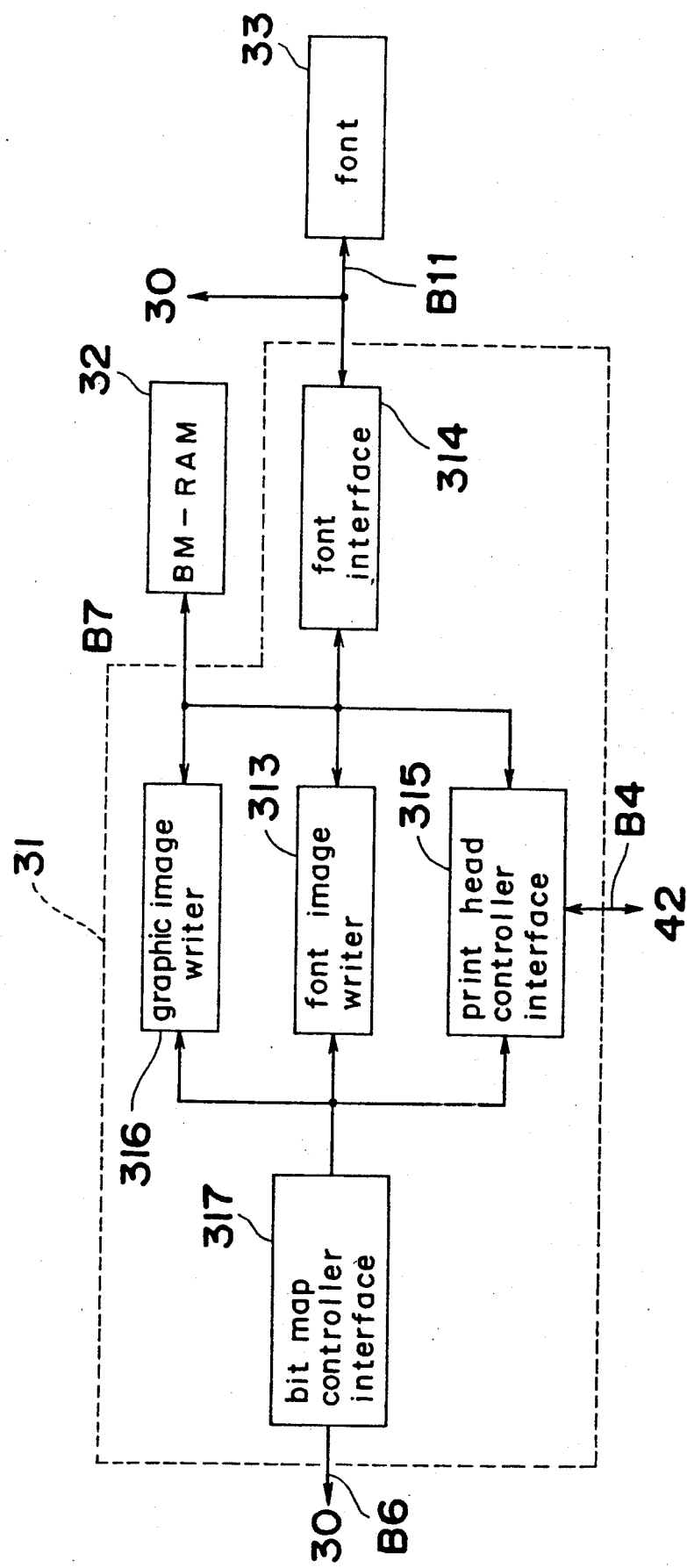
FIG. 5 is a block diagram of a bit map writer.

FIG. 5 shows a detailed block diagram of the bit map writer 31. The bit map writer 31 has an input function for writing data in the BM-RAM 32 and an output function for sending the data of BM-RAM 32 to the print engine 4.

The input function for writing data in the BM-RAM 32 is divided in two functions: writing of a line or a circle performed by a graphic image writer 316 and writing of font performed by a font image writer 313. Both writers 313 and 316 are logic parts processing to intermediate codes sent through a bit map controller interface 317 from the bit map controller 30. Almost all processing of the graphic image writer 316 is on the writing in the BM-RAM 32 by analyzing the parameters in intermediate codes, while almost all processing of the font image writer 311 is the writing in the BM-RAM 32 of font image read from the font part 33 through a font interface 314 according to the data of intermediate codes.

An output function on printing is performed by a print head controller interface 315. That is, when a print start code is received through the bit map controller interface 317 from the bit map controller 30, the print head controller interface 315 sends the data in the BM-RAM 32 according to synchronization signals sent through the bus B4 from the print head controller 42 of the print engine 4.

(b) emulation mode and bit map control

Next, the action of the bit map controller 30 is explained below.

The CPU 303 controls the writing in the BM-RAM 32 and the printing with the electrophotography process part 45 according to the programs stored in the system ROM 305 and the system RAM 307.

Programs available in this printer system include a host process and a packet process both stored in the system ROM 305 and a user process stored in a download segment of the system RAM 307. The three processes are independent of each other, and they are processed in parallel with use of time sharing processing with priority order. The priority in the three programs is the order of packet process, host process and user process.

The system ROM 305 also stores a scheduler for managing the processes on timer interrupts (refer FIG. 11), and a start process for the initialization performed on the start.

Figure 9:
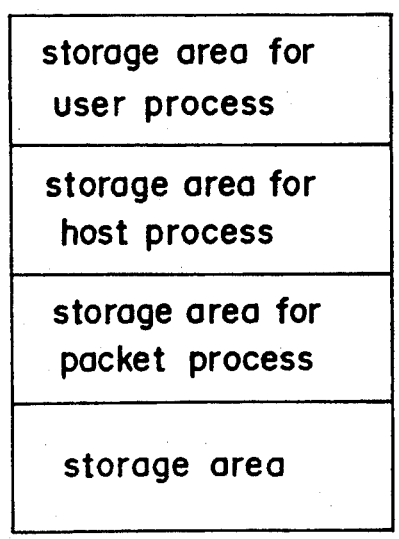
FIG. 9 is a memory map of a current process block.

The scheduler stored in the system ROM 305 changes the current process according to the status on a timer interrupt with the timer 302. There is an area called a current process status (CPS) block in the system ROM 307 (refer FIG. 9), and the contents of registers of the CPU 303 are stored in CPS on changing a process. Thus, each process can perform action independent of each other. This action of bit map control is disclosed in Japanese patent laid open publication No. 231957/1988. The action of the bit map control of this invention is different from that disclosed in the publication only in a part relating to the landscape designation function in the user process and in the host process.

An emulation mode means a mode wherein the printer acts according to an emulation program for other printers. In the emulation mode, a user process, a host process and a packet process are used successively.

Figure 12:
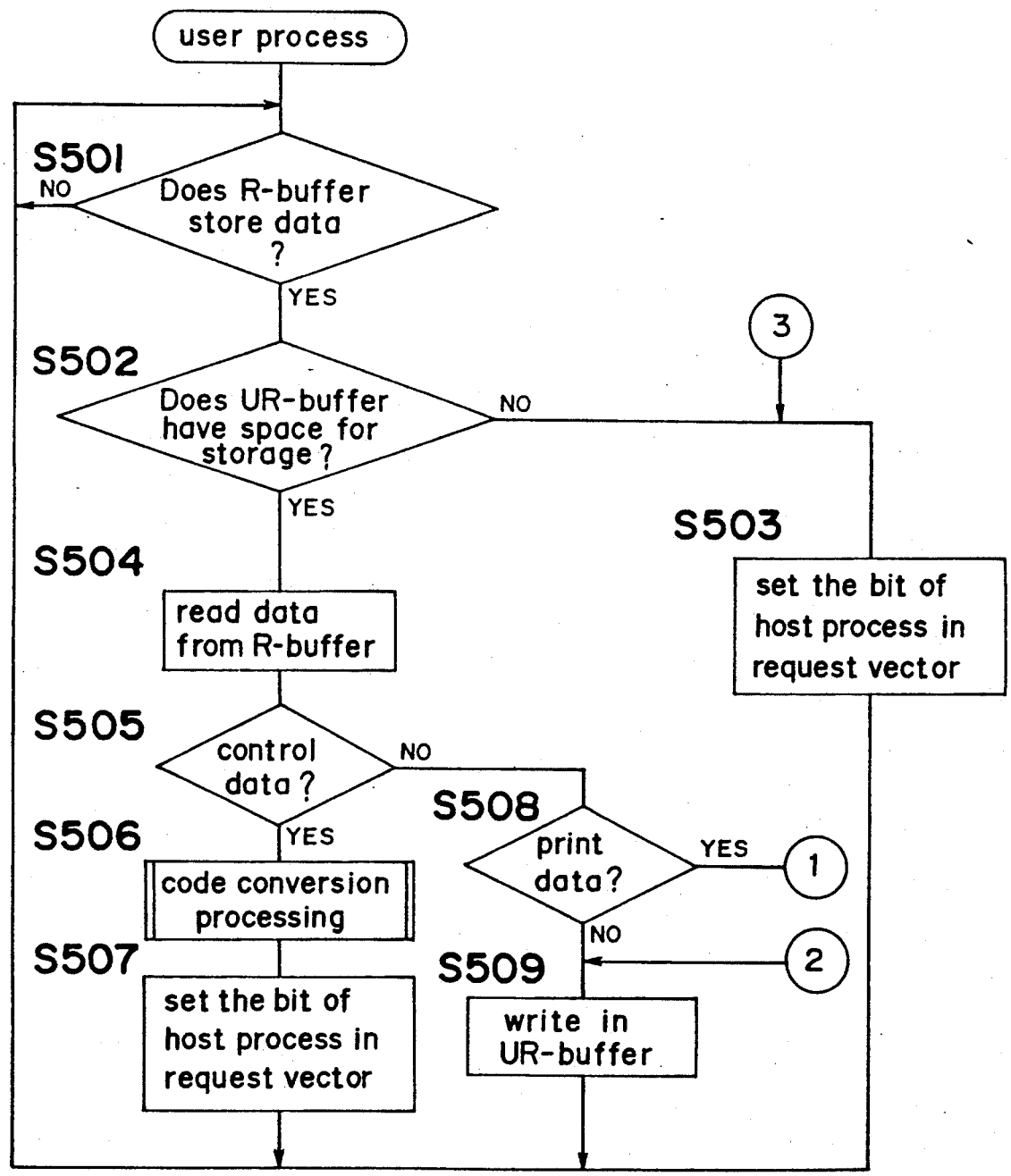
FIGS. 12(a) and (b) are flowcharts of user process.

A user process (refer FIGS. 12(*a*) and (*b*)) is a program wherein data sent in the protocol in correspondence with other printers are converted to the data in the protocol of the printer (host protocol) which the host process can analyze and the converted data are stored in the UR-buffer 306 to be used for the host process. An emulation program is supplied with download from a font cartridge, an internal ROM or a host 1. If the protocol conversion is not necessary, it is not performed.

In this embodiment, a user process is loaded when the electric power is turned on or when a load request code is received from the host 1 after a font cartridge is inserted. However, any method of loading or any timing may be adopted according to the need of a user. Further, a plurality of user processes may be stored in a font cartridge.

In the host process (refer FIG. 14), the data received from the host 1 to be stored in the R-buffer 304 or the UR-buffer 306 are analyzed and the resultant packets as intermediate data for controlling the bit map writer 31 and the print engine 4 are written in the packet buffer 308.

In the packet process, packets stored in the packet buffer 308 are analyzed to send data through the bit map writer interface 310 to the bit map writer 31, through the font interface 309 to the font part 33 and through the print engine interface 311 to the interface controller 40 in order to write data in the BM-RAM 32 and to control the print engine 4.

Next, the automatic change between landscape and portrait images in an emulation program when the emulation program is performed as a user process is explained. As explained above, the data sent in the protocol for another printer are stored at first in the R-buffer 304. When the scheduler for managing processes changes the current process to the user process on a timer interrupt, the user process to be started stores a landscape designation command in the UR buffer 306 if the width of received data is decided to be larger than the maximum size in which an image can be printed at present (or the width of paper size set in a cassette), and then the received data stored in the R-buffer 304 are converted to the protocol of the present printer to be stored in the UR-buffer 306. Thus, the host process for performing temporary editing of data reads the data stored in the UR-buffer 306 when the user process is started, otherwise the host process reads the received data stored in the R-buffer 304. There is no need to change the user process in other points. There is also no need to change other processes for controlling print action. Therefore, a user process is required only simply to perform the data conversion, and the development of emulation software becomes easy.

(c) image area and landscape designation function

Figure 6:
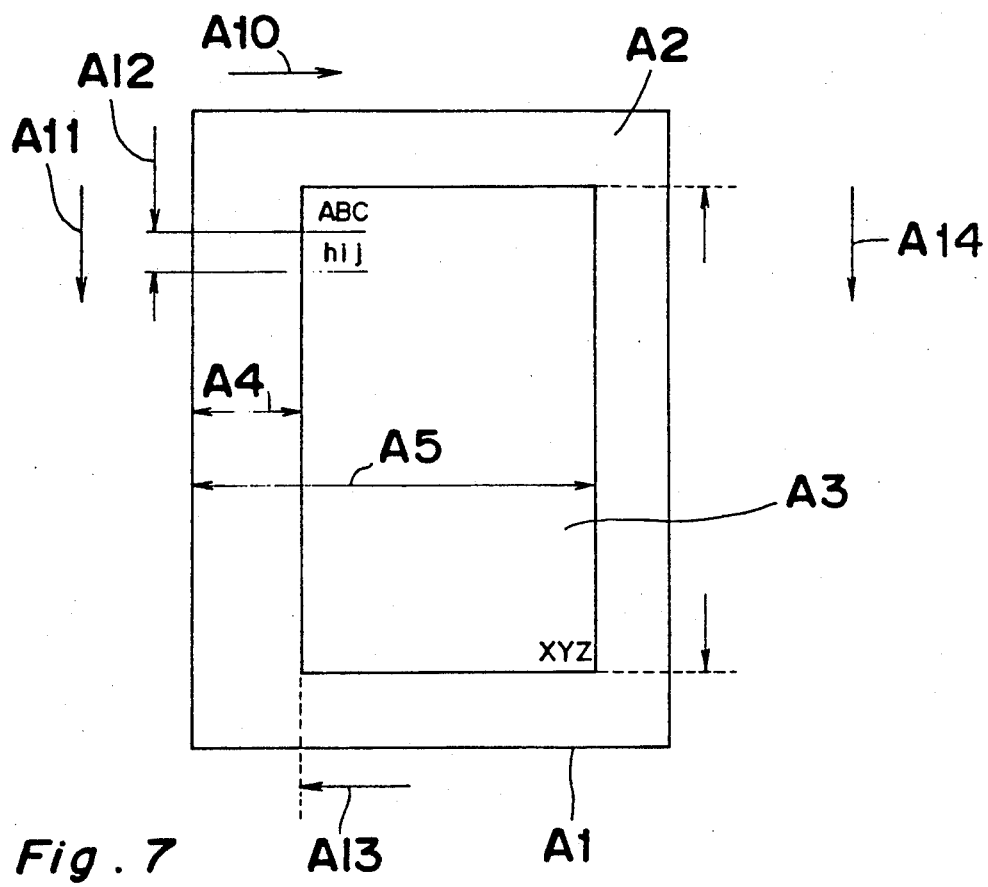
FIG. 6 is a diagram of a portrait image.
Figure 7:
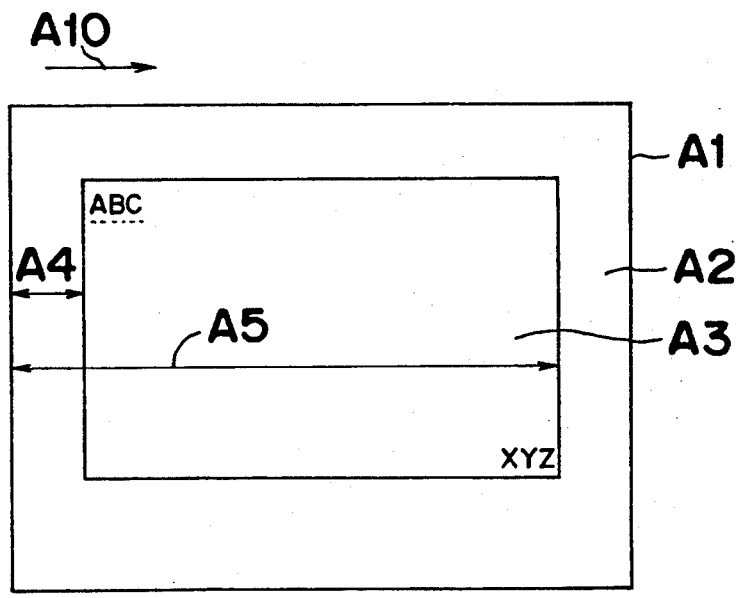
FIG. 7 is a diagram of a landscape image.

First, the concept of image area will be explained. FIGS. 6 and 7 show examples of image data received from the host 1 in ordinary cases (portrait), wherein an area designated as the whole area A1 corresponds to the size of a sheet of paper. A margin area A2 is a margin portion on printing on a paper, while print data written in the BM-RAM 32 is the remaining image area A3. In case of FIG. 6, image data are generated in a portrait image area A3, while in case of FIG. 7, image data are generated in a landscape image area A3. In other words, in case of FIG. 6, the image area A3 is rectangular with the height greater than the width, while in case of FIG. 7, the image area A3 is rectangular with the width greater than the height. The margin area A2 may be changed in the unit of page according to the instruction from the host 1. A left margin A4 means the length from the left end of the whole area A1 to the start position of writing characters of the image area A3, while a right margin A5 means the length from the left end of the whole area A1 to the right end of the image area A3.

The printing is started at the leftmost point in the top line, and characters are printed successively in the printing direction A10. If a line feed code is received on the way, the next printing position is shifted by a line feed width A12 in the line feed direction A11. Further if a carriage return code is received, the next printing position is moved to the carriage return position A13 at the leftmost position in the image area A3. The direction A14 for feeding papers on printing is a direction rotated by 90° from the printing direction A10.

The maximum width in which the printing is possible in a paper sheet set in a cassette of the printer is determined according to the right margin A5 and the left margin A4. If the left margin A4 is taken as a constant, the printing width is determined by the maximum of the right margin A5. Then, if the maximum of the right margin A5 is compared with the width of image, it can be decided whether the printing is possible or not.

In a printer of the embodiment, as explained above, a program called a user process can be performed and in the user process an emulation program for other dot printers can be run. In case of an application program such as a spread sheet program for other printers, the width of an image sent from the host 1 may exceed the width in which an image can be printed in a sheet of paper set in a cassette in the printer. In such a case, the as-received image cannot be printed on a paper.

Figure 8:
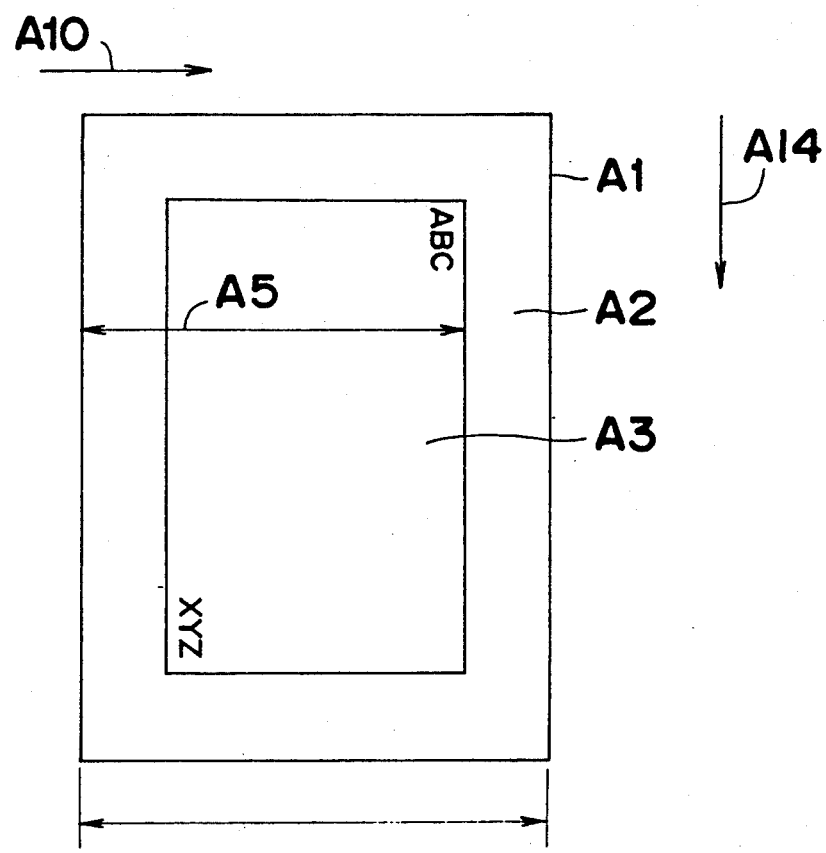
FIG. 8 is a diagram of an image shown in FIG. 7 rotated by 90° in the landscape mode.

If a landscape mode is provided, the received image is rotated by 90° with respect to a sheet, as shown as "ABC" and "XYZ" in FIG. 8, to be written in the BM-RAM 32. Then, the direction A14 of printing is changed with respect to the received image, and the printing becomes possible.

Unfortunately, a landscape mode is not provided in a printer of the embodiment, and the landscape mode cannot be designated with use of an operational panel. However, in a printer of the embodiment, if it is decided that an image of a width larger than a predetermined value is generated in an emulation program, the landscape command is generated automatically and the image received from a host is rotated by 90° with respect to a sheet so as to be able to be printed.

Figure 12B:
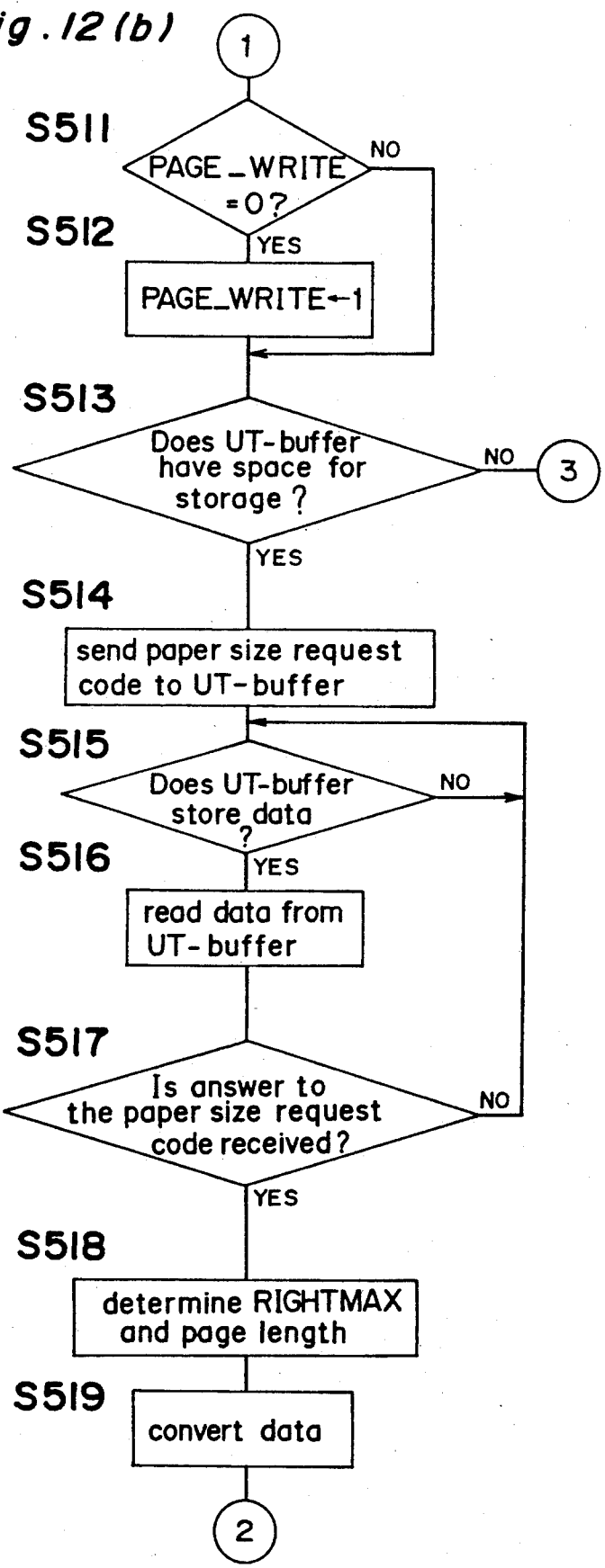
Figure 17A:
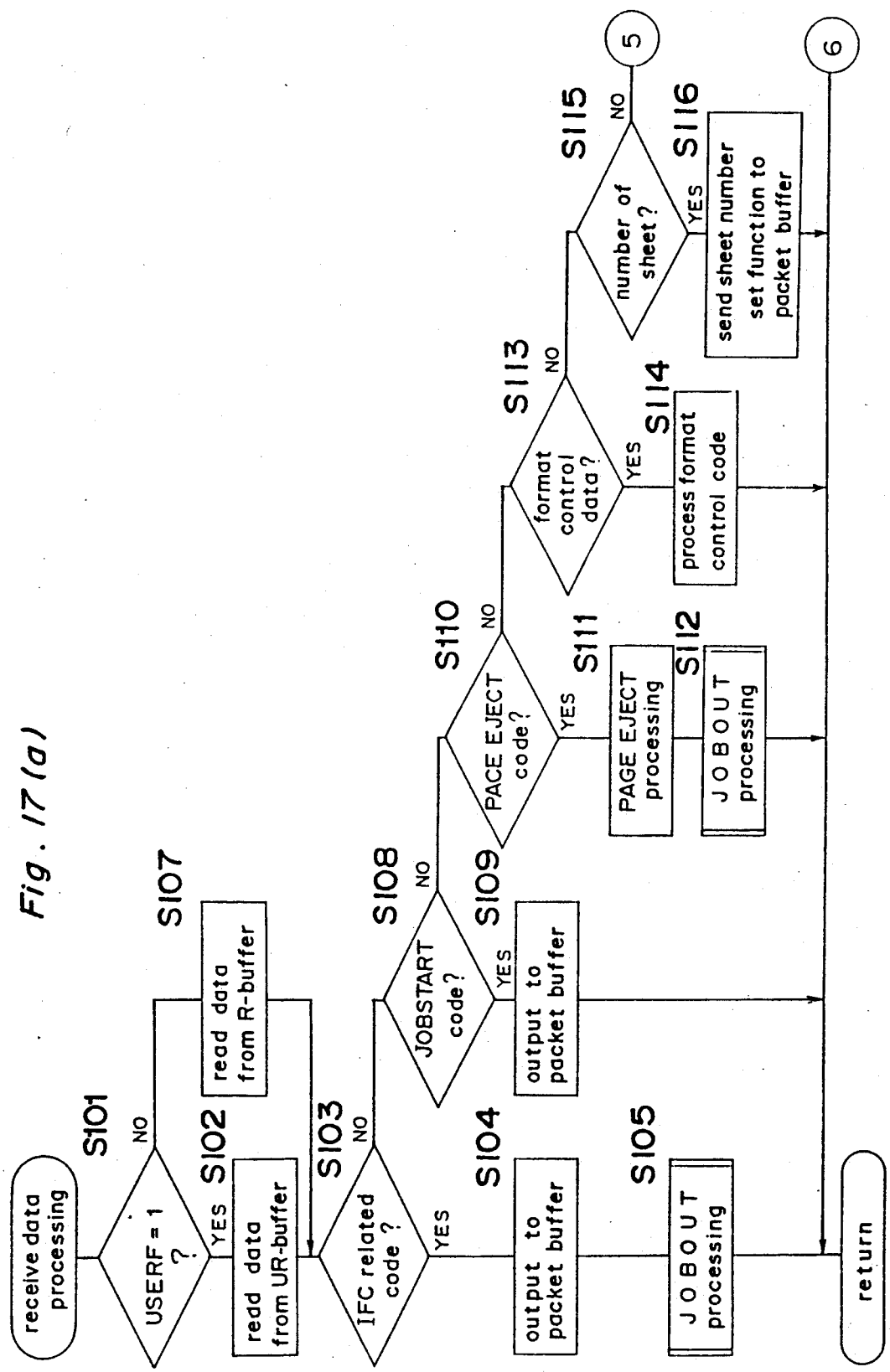
FIGS. 17(a)–(d) are flowcharts of receive data processing.
Figure 17B:
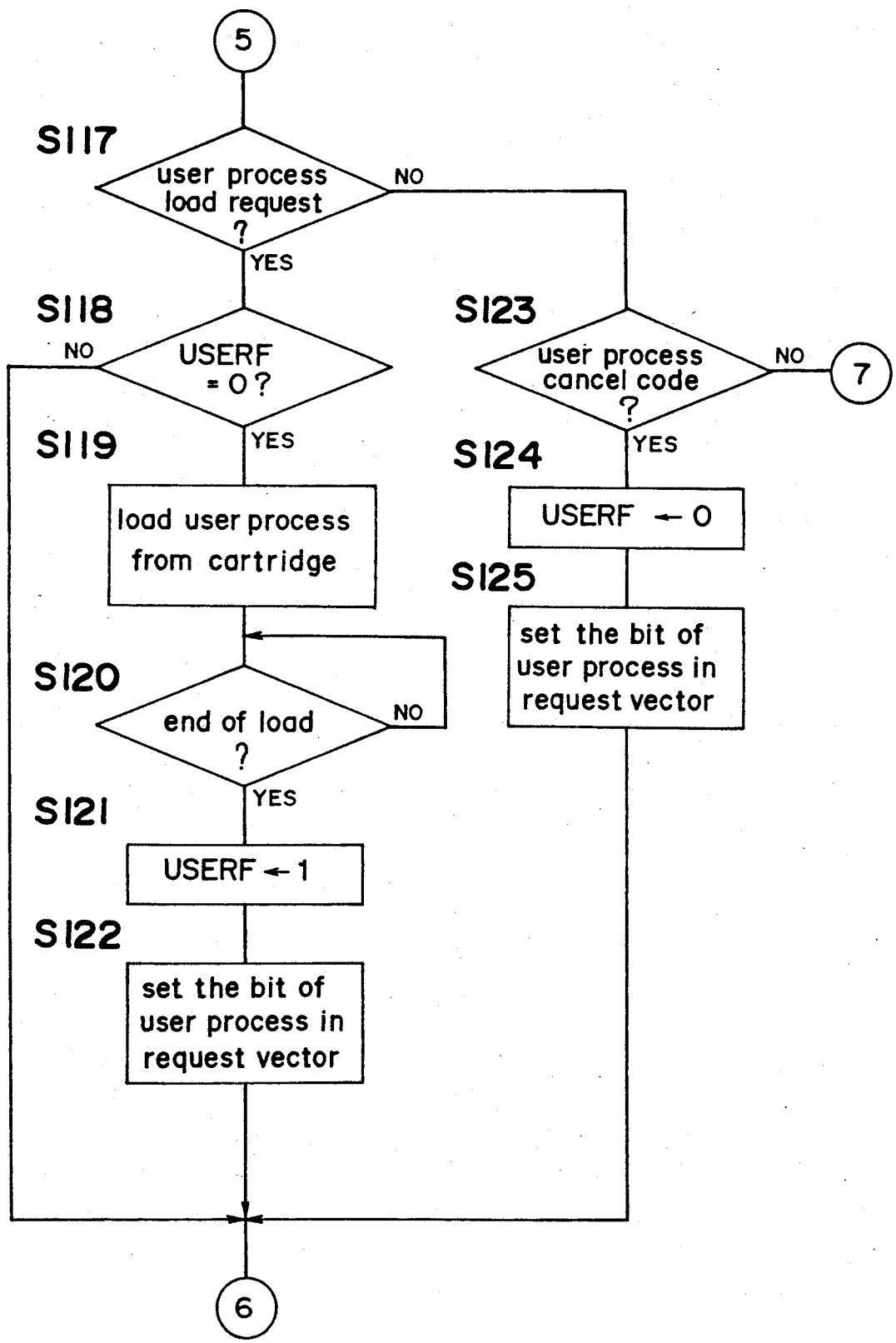
Figure 17C:
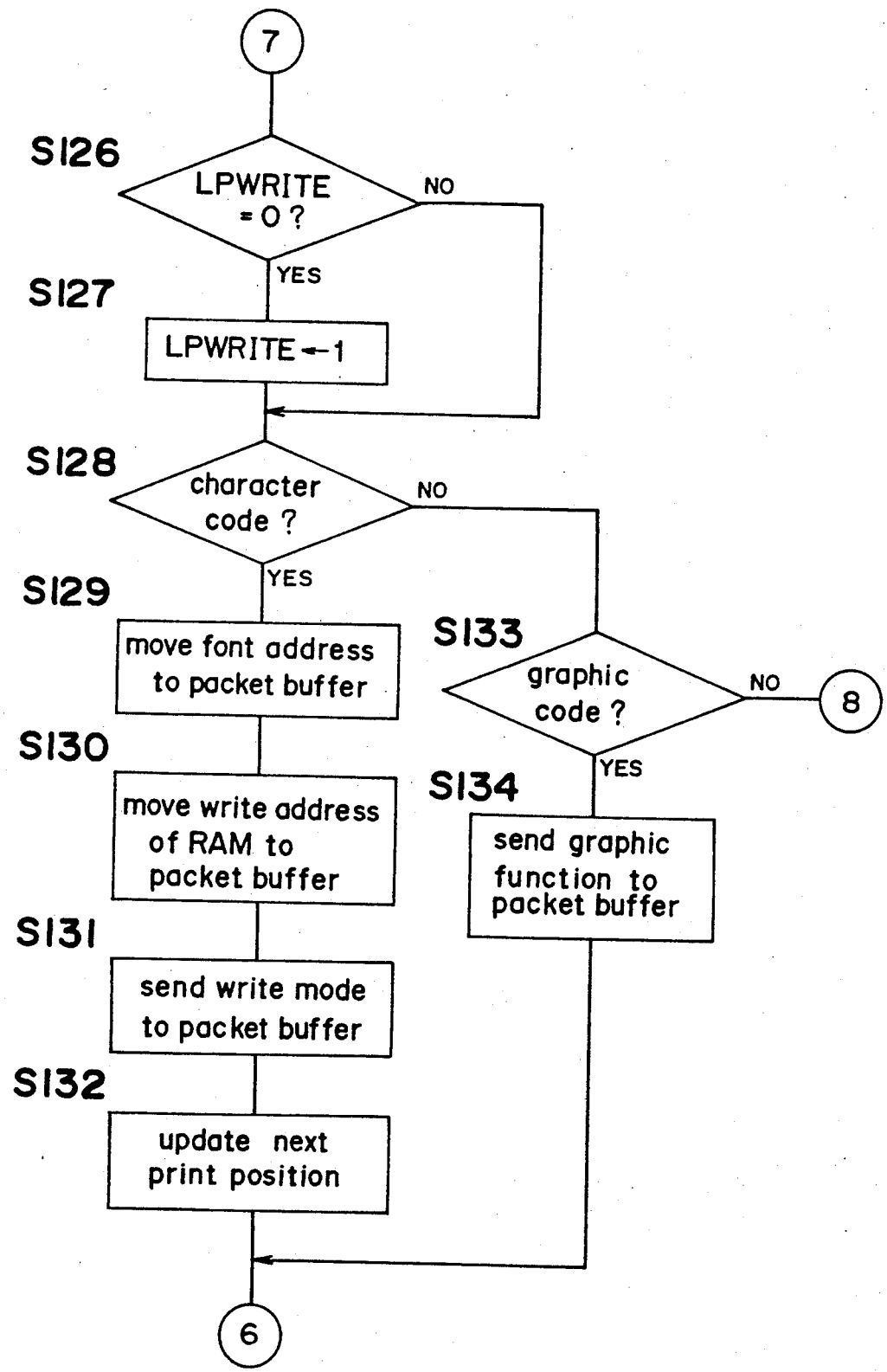
Figure 17D:
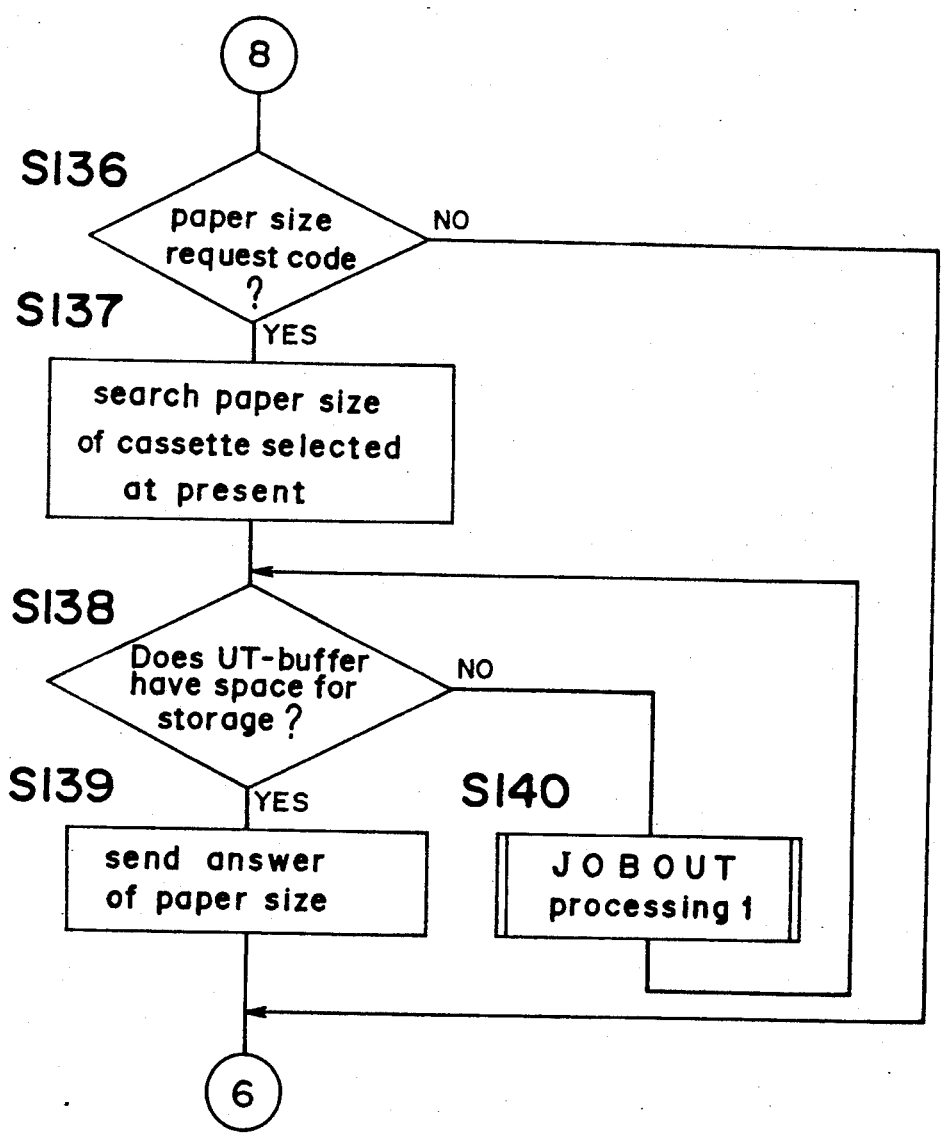

To be concrete, a command for requesting the size of a sheet of paper set in the printer is sent from an emulation program (refer FIG. 12(b), step S514), and when this command is received, the paper size (or width) of a sheet of paper set in a cassette selected at present in the printer is written in the UT-buffer 312 (FIG. 17(d), step S136-S139). In the code conversion processing (refer FIG. 13) of right margin set command in a user process, the size of sheets of paper set in the selected cassette is read at the beginning of a page of image, and the paper size is compared with the image size designated by the emulation program. If the image size is larger than the paper size, the landscape command is sent to the UR-buffer 306, and the image size is set as the right margin (refer FIG. 13, step S601-S605). Thus, in the printer wherein the landscape command is not provided and the landscape command is not designated with the operational panel, an image size larger than the paper size of sheets of paper set in the cassette at present is designated, the image is rotated automatically by 90° so as to change to a landscape image (refer FIG. 8).

(d) flow of bit map control

The action of the bit map control will be explained below with reference to flowcharts. However, the explanation of the packet process will be omitted because it is not related to the change between the portrait and landscape images and it is the same as disclosed priorly.

(d - 1) start process

Figure 10:
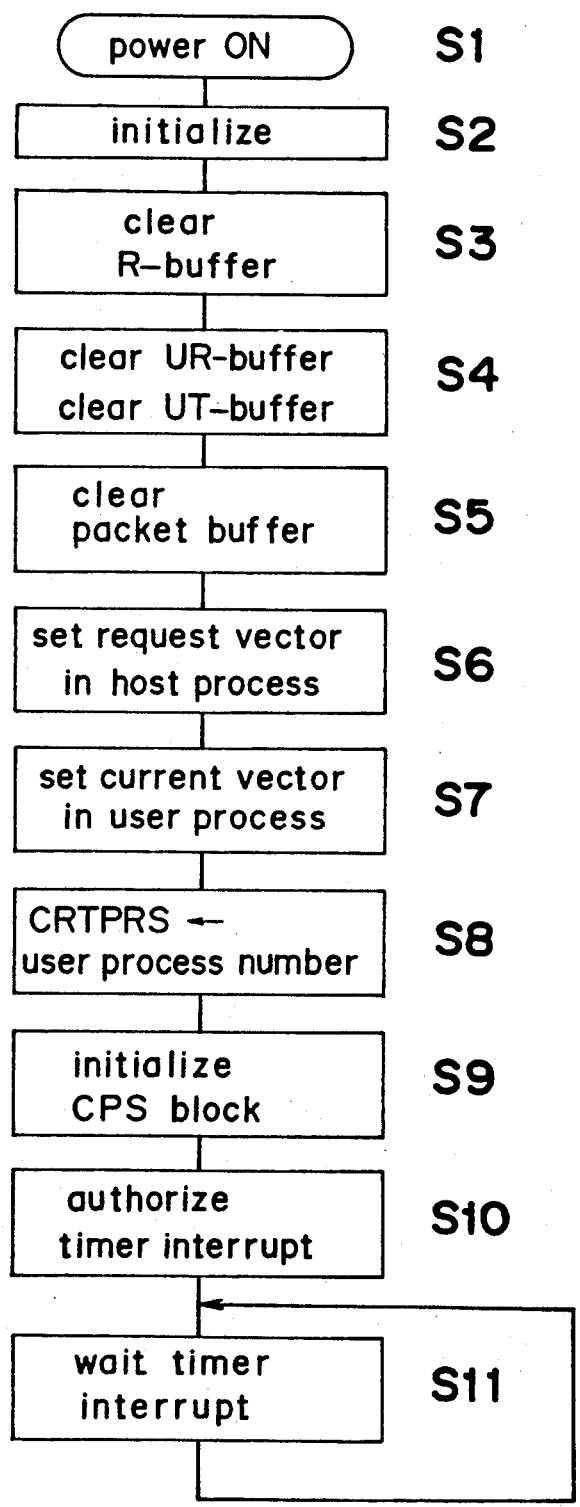
FIG. 10 is a flowchart of a start process.

FIG. 10 shows a flowchart of the start process, which is used once at the start.

Two vectors, a request vector and a current vector, are used in this process for representing statuses and both are stored in a current process status (CPS) block in the system RAM 307. When the scheduler (refer FIG. 11) is started on a timer interrupt, the request vector is used by the interrupted process to transmit the stop of run to the scheduler and a request of the start of another process, and bits in the request vector in correspondence to each process are set or reset. In the current vector, the bit in correspondence to a process under run is set, and when the scheduler is started, the bit for the interrupted process has been set. Further, the numbers of the processes represented in the current vector are stored in CRTPRS in the CPS block, and the number is larger with increase in the above mentioned priority order.

In the start process, when the electric power source is turned on (step S1), the initialization of the internal (CPU303) is performed (step S2), and the R-buffer 304, the UR-buffer 306, the UT-buffer 312 and the packet buffer (FIFO memory) 308 are cleared (step S3, S4 and S5). Next, in order to prepare to start a user process, the bit for the host process in the request vector is set (step S6), the bit for the user process in the current vector is set (step S7), and the number for representing the user process is stored in the CRTPRS (step S8). Then, the CPS block in the system RAM 307 is initialized (step S9). To be concrete, in each CPS, the value of the start address of each process program is written in an area for storing the data of the address pointer for the run of the CPU 303, while a predetermined address value is stored in an area for storing a stack pointer. If necessary, the initial values of other pointers are also written.

After the initialization step, an interrupt is authorized (step S10), and the flow proceeds to a loop of wait for a timer interrupt (step S11). If a timer interrupt is accepted, the scheduler (refer FIG. 11) is started, and the scheduler determines the next process according to the request vector, the current vector and the CRTPRS mentioned above.

Thus, the data in the protocol different from that of this printer can be dealt with by changing a user process to be down-loaded.

(d - 2) scheduler

Figure 11:
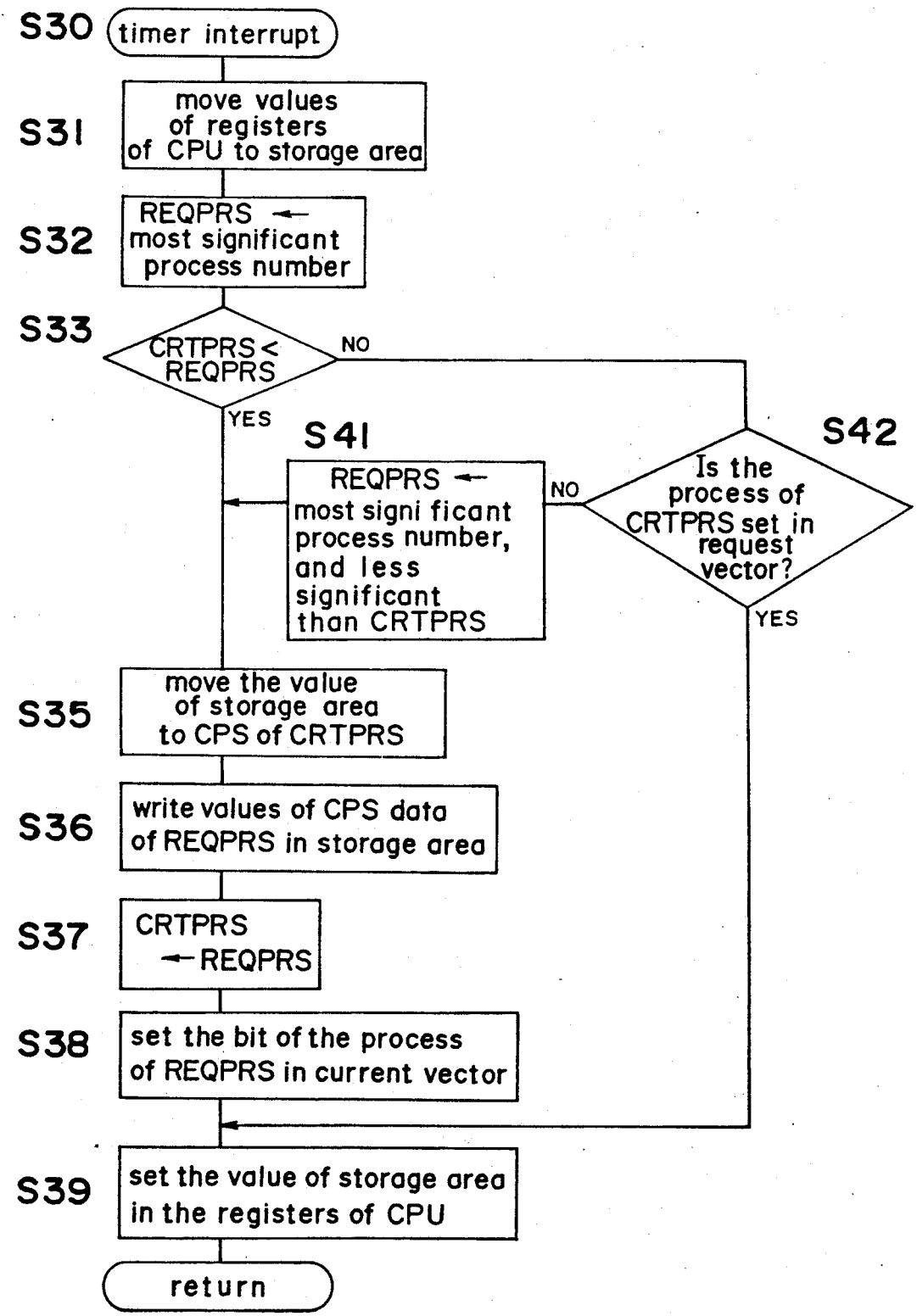
FIG. 11 is a flowchart of a scheduler.

FIG. 11 shows a flow of the scheduler to be started on a timer interrupt. First, a timer interrupt is accepted (step S30), the values of the registers in the CPU 303 are stored in the storage areas in the CPS block (step S31), and the number of the most significant process among the bits set in the request vector is written in the REQPRS (step S32). In the CRTPRS, the number of the process run just before the timer interrupt is stored. Then, it is decided if the start of a process more significant than the process run just before the timer interrupt is requested or not by comparing REQPRS with CRTPRS (step S33). If it is decided that the start of a more significant process is not requested (No at step S33), it is decided if the process under processing (designated by CRTPRS) is abandoned to run further by resetting the bit for the process (step S42). If it is decided that the process is not abandoned to run further (YES at step S42), the data of the registers in the storage areas in the CPS block are set in the CPU 303 (step S39), and the flow returns to the main flow. In this case, the process interrupted by the timer interrupt is run further. If it is decided that the process is abandoned to run further (No at step S42), the number of a process less significant, but the most significant than the process designated by the CRTPRS is written in the REQPRS (step S41), and the flow proceeds to step S35, as in case of YES at step S33. Then, the value of the storage area is moved to the CPS of the process to be interrupted designated by the CRTPRS (step S35), and the value of the CPS of the process is moved to the storage area (step S36). Further, the value of the REQPRS is written in the CRTPRS (step S37), and only the bit of the process designated by the REQPRS is set in the current vector, whereas the other bits are reset (step S38). According to these processing, the value of the register of the process designated by the REQPRS is moved in the storage area, and the process designated by the REQPRS is the destination to be returned. Then, the flow proceeds to step S39, as in case of YES at step S42.

(d - 3) user process

FIGS. 12(a) and (b) show an example of a flow of a user process. Though there may be several programs according to corresponding protocols as a user process, the basic structure of a user process is included in FIGS. 12(a) and (b). Especially, step S501–S504 and S509 are common in each user process in order to respond to other processes.

First, it is decided if any data are stored in the R-buffer 304 (step S501), and if the decision is YES, then it is decided if the UR-buffer 306 has a space for storing more data (step S502).

If it is decided that the UR-buffer 306 has no more space (No at step S502), the start of the host process is requested with the request vector (step S503) in order for the UR-buffer 304 to have a space for storing data. Then, the flow returns to step S501.

If it is decided that the UR-buffer 306 has a space for storing more data (YES at step S502), the data is read from the R-buffer 304 (step S504), and protocol conversion processing (step S505–S508, and S519) is performed. That is, if the data is decided to be a control data (YES at step S505), the code conversion processing is performed (step S506, refer FIG. 13). Then, if necessary, the landscape designation command is sent to the UR-buffer 306, and the bit for the superior process (host process) is set in the request vector (step S507), and the flow returns to step S501.

If it is decided that the data is not a control data (No at step S505), it is decided next if the data is a print data (step S508). If it is decided that the data is not a print data (No at step S508), the data is written in the UR-buffer 306 (step S509), and the flow returns to step S501.

If it is decided that the data is a print data (YES at step S508), it is decided next if a PAGE_WRITE flag is "0" or not (step S511) or if the data is the first data in a page or not, and if the decision is YES, the PAGE_WRITE flag is set to be "1" (step S512). Then, it is decided if the UT-buffer 312 has a space for storing data (step S513). If the decision is YES, a paper size request code for requesting the size of sheets of paper set in the cassette of the printer is sent to the UT-buffer 312 (step S514), and the UT-buffer 312 is watched until an answer to the paper size request code is received (step S515–S517). If the answer is received (YES at step S517), parameters for setting image size such as the width of the sheet, RIGHTMAX, and the page length (refer FIGS. 6 and 8) are set (step S518). Finally, the data conversion to the protocol of this printer is performed (step S519) and the converted data are stored in the UR-buffer 306 (step S509), and the flow returns to step S501.

In this embodiment, the received data is classified in control codes and print data, and the start of the host process is requested only when a control code is received (step S507). However, the timing of setting the bit for the host process in the request vector can be assigned at any position in the flow by taking into account the form of the protocol to be changed or the conversion efficiency.

Figure 13:
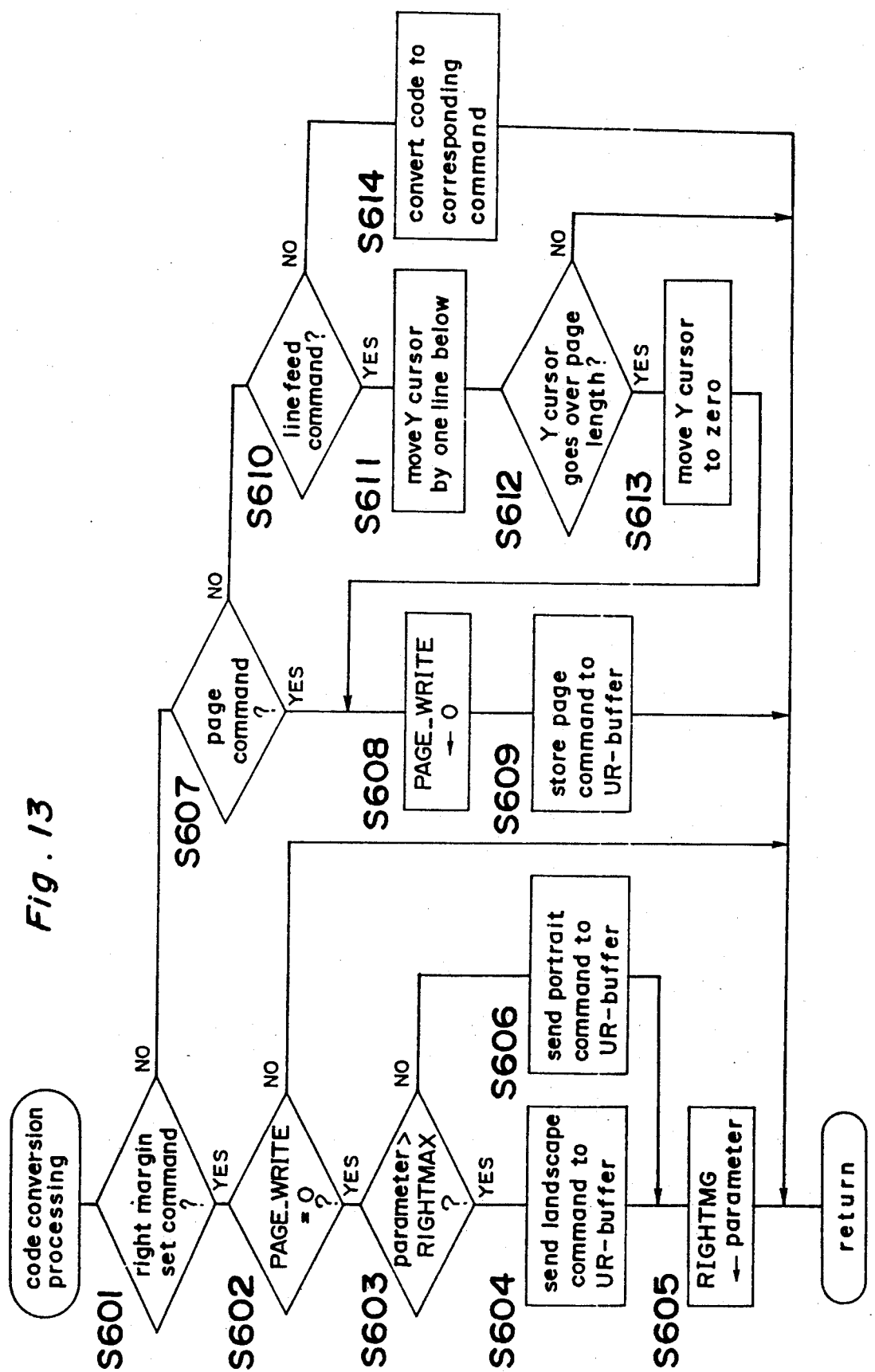
FIG. 13 is a flowchart of a code conversion processing.

FIG. 13 shows the detail of the code conversion processing (FIG. 12 step S505) of control codes. If it is decided that the data to be read from the R-buffer 304 is decided to be the right margin set command (YES at step S601), it is decided next if a flag PAGE_WRITE for showing that print data are written in the page is "0" or not (step S602). If the flag PAGE_WRITE is "0" or print data are not written in the page (YES at step S602), the processing of steps S603–S605 is performed. That is, it is decided if the parameter of the right margin set command is larger than the maximum width RIGHTMAX of print area (step S603). If the parameter exceeds RIGHTMAX (YES at step S603), the landscape command is sent to the UR-buffer 306 (step S604); otherwise the portrait command is sent to the UR-buffer 306 (step S606). Then, the value of the parameter is set in RIGHTMG for showing the present right margin value (step S605), and the flow returns to the main flow.

The processing of steps S607–S614 relates to the PAGE_WRITE flag. If the control code to be read the R-buffer 304 is decided to be a page command (OCH-)(YES at step S607), the PAGE_WRITE flag is set to be zero (step S608), and the page command is sent to the UR-buffer 306 (step S609).

If the control code to be read from the R-buffer 304 is decided to be a line feed command (YES at step S610), the cursor in the Y direction is moved by one line below (step S611) and it is decided if the Y cursor goes over the predetermined page length (step S612). If it is decided that the Y cursor goes over the page length (YES at step S612), the Y cursor is moved to zero (step S613), and the flow moves to step S608 for the processing of page command.

If the control code is decided to be one of other commands (NO at step S610), the code is converted according to the command (details are not explained here), and the converted command is sent to the UR-buffer 306 (step S614), and the flow returns to the main flow.

(d - 4) host process

Figure 14:
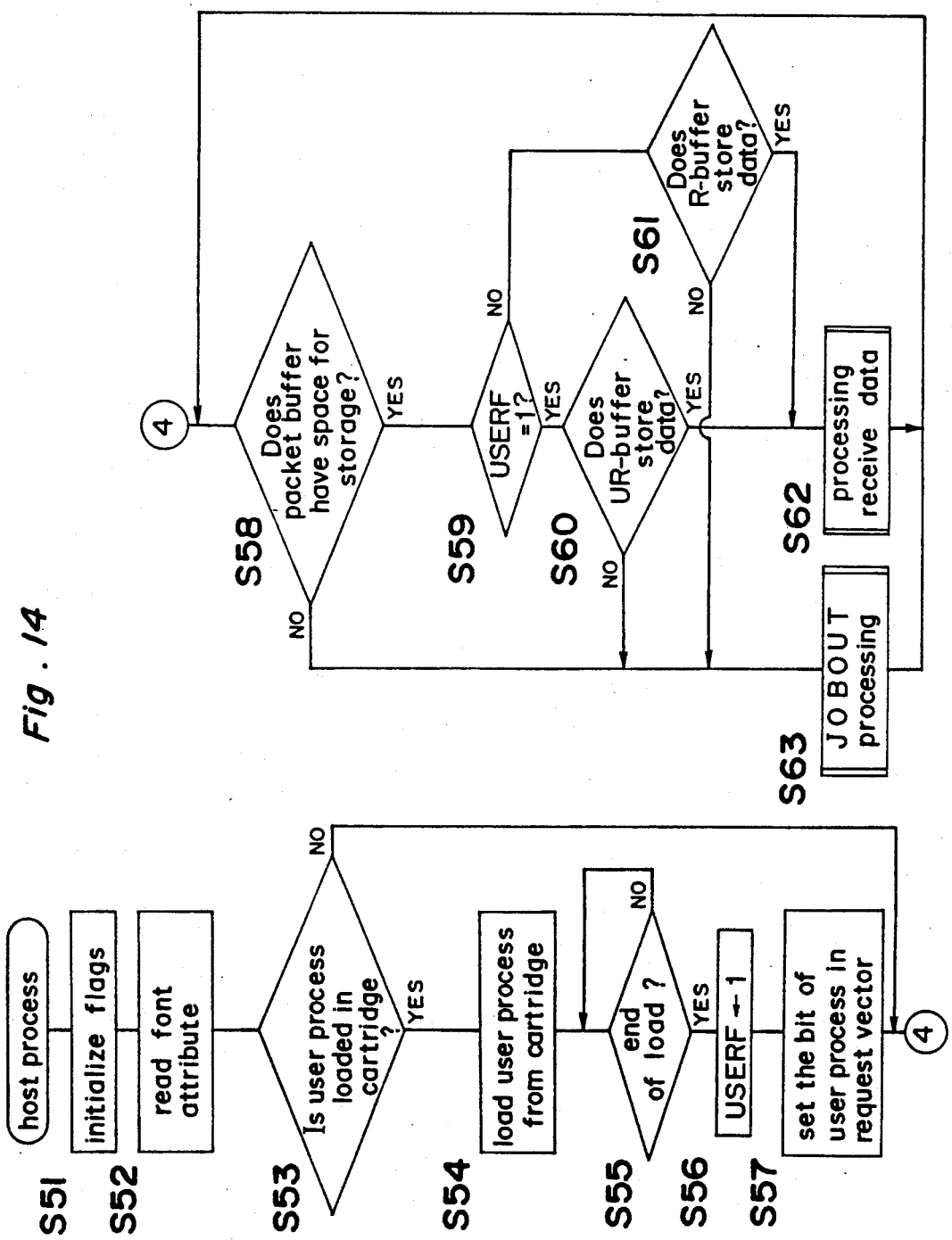
FIG. 14 is a flowchart of a host process.

FIG. 14 shows a flow of host process. The first start of the host process is performed according to a change to the host process in the scheduler started on a timer interrupt, as explained above, and the top address of the host process is written in the program counter of the CPU 303 of the bit map controller 30.

First, the flags used in the host process are initialized (step S51). That is, a USER flag (USER) for showing to perform the user process or not is reset to be "0", while an LPWRITE flag for showing that a temporary image is being edited in the received data processing is also reset to be "0". Then, the font attribute is read from the front part 33 in order to prepare the generation of intermediate codes (step S52). Then, it is decided if a user process is loaded in a font cartridge of the font part 33 (step S53), and if the decision is YES, the user process is loaded in a predetermined area in the system RAM 307 (step S54). Then, after waiting the end of the load (YES at step S55), the USER flag is set to be "1" (step S56), and the bit of the user process is set in the request vector (step S57). That is, when a user process being the least significant in the priority order is stored, the bit for the user process is always set in the request vector in order not to abandon to run the user process itself. After these initialization step S51–S57), the flow proceeds to a main loop (step S58–S63)

In the main flow, if the packet buffer 308 is decided not to have a space for storing more data (NO at step S58), and if the USER flag is decided to be "1" (YES at step S59) and the UR-buffer 306 is decided not to have data (NO at step S60), and if the USER flag is decided not to be "1" (NO at step S59) and the R-buffer 304 is decided not to have any data (NO at step S61), the received data is not processed, and JOBOUT processing (refer FIG. 15) is processed (step S63), wherein the request vector is updated in order for the host process to request to the scheduler to change to a more significant process (packet process in this embodiment). Otherwise, the receive data is processed (step S62). Then, the flow returns to step S58.

This flow shows clearly that the receive data processing (step S62) is iterated except the specified conditions such as a condition that no area is available for storage in the packet buffer 308 when the request vector is updated by the JOBOUT processing, because the flow returns to the host process even when the scheduler is started on a timer interrupt.

Figure 15:
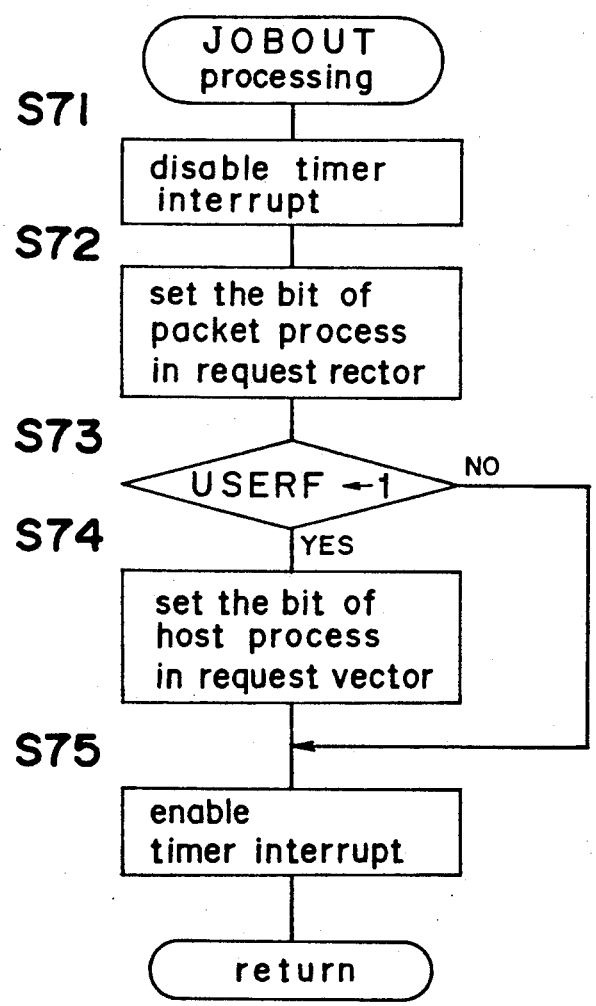
FIG. 15 is a flowchart of JOBOUT processing 1.

FIG. 15 show the flow of the JOBOUT processing, wherein after a timer interrupt is disabled (step S71), the bit of a more significant process (packet process in this embodiment) is set in the request vector (step S72) in order for the host process to request to the packet process. Then, if a user process is decided to be stored (the USER flag is "1") (YES at step 73), the bit of the host process is reset in the request vector in order to abandon the run of the host process itself because the host process in not the least significant process. On the other hand, if a user process is decided not to be stored (NO at step S73), the bit for the host process is kept to be set because the host process becomes the least significant process. Then, a timer interrupt is enabled again (step S75), and the flow returns to the main flow.

Figure 16:
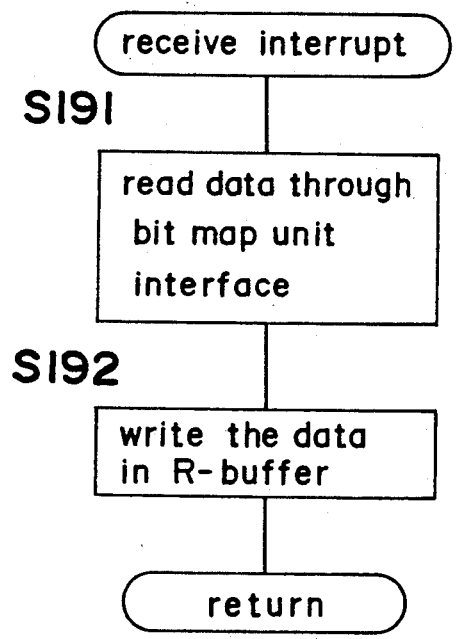
FIG. 16 is a flowchart of receive interrupt.

As shown in FIG. 16, receive data are read through the bit map interface 301 on a timer interrupt (step S191), and they are stored in the R-buffer 304 (step S192).

FIGS. 17(a)–(d) shows a flow of the receive data processing (FIG. 15 step S62). In order to process receive data, data has to be read first from the R-buffer 304. However, if a user process exists (USER flag="1"), the user process has been stored in the UR-buffer 306 after the data stored in the R-buffer is converted according to the protocol of this printer, and user process has priority. Thus, if it is decided that the USER flag is "1" (YES at step S101), data is read from the UR-buffer (step S102), otherwise data is read from the R-buffer (step S107).

Receive data are classified into six groups:
(1) codes related to print engine (step S103–S105), (2) job control codes (JOBSTART and PAGE_EJECT) (step S108–112), (3) format control codes (step S113–S114), (4) print data (character codes and graphic codes) (step S128–S134), (5) user process control codes (step S118–S122), and (6) printer status request codes (step S136–S140).

First, it is decided that the data read from the UR-buffer 306 or R-buffer 304 is decided to be a print data (NO at step S126), the data are converted to intermediate codes (packets) to be sent to the packet buffer 308. First, if the LPWRITE flag for showing the edition of temporary image is decided to be "0" (NO at step S126), the LPWRITE flag is set to be "1" (step S127). Then, it is decided if the receive data is a character code or not (step S128). If the receive data is decided to be a character code (YES at step S128), the address of the font pattern of the character (step S129), the write address in the BM-RAM 32 in correspondence with the print position in the image area (step S130) and the write mode (step S131) are sent to the packet buffer 308 in the same format for the font image writer 311. Then the next print position is updated (step S132), and the flow returns to the main flow.

If the receive code is decided to be a graphic code (YES at step S133), the graphic code is sent to the packet buffer 308 in the same format as a command for the graphic image writer 316 (step S134). Then, the flow returns to the main flow.

If the receive data is decided to be a code related to the interface controller 40 (YES at step S103), it is sent to the packet buffer 308 as a function-type intermediate code of a form different from that of print data in order to synchronize with print data (step S104), and the JOBOUT processing (refer FIG. 15) is performed (step S105). Then, the flow returns to the main flow.

If the receive data is decided to be a paper size request code (YES at step S136), the size of sheet of paper in the cassette to be selected at present is get from the print engine 4 through the interface controller 40 (step S137). Then, if it is decided that the UT-buffer 312 has a space for storing data (YES at step S138), the answer to the paper size request code is written in the UT-buffer 312. However, if the UT-buffer 312 is decided to have no space for storage (NO at step S138), the processing is transferred to the packet process through the JOBOUT processing (step S140), waiting until the UT-buffer 312 has a space for storing data. Then, the processing proceeds to step S139. Finally, the flow returns to the main flow.

If the receive data is decided to be a JOBSTART code for sectioning a group of pages (YES at step S108), it is sent to the packet buffer 308. If the receive data is decided to be a PAGE_EJECT code (YES at step S110), it is sent to the packet buffer 308 (step S111) and the JOBOUT processing (refer FIG. (5)) is performed (step S112). Then, the flow returns to the main flow.

If the receive code is decided to be a format control code (YES at step S113), the format for printing is controlled (step S114), and the flow returns to the main flow.

If the receive data is decided to be a sheet number code for designating the number of sheets of copies of the same image (YES at step S115), a function corresponding to the number is sent to the packet buffer 308 in order to have synchronization with print data (step S116), and the flow returns to the main flow.

If the receive data is decided to be a user process request code (YES at step S117), it is decided next if a user process is stored or not (step S118). If a user process is decided not to be stored (YES at step S118), the program of a user process is loaded from a font cartridge (steps S119 and S120). Then, the USER flag is set to be "1" (step S121), and the bit of the user process is set in the request vector (step S122).

On the other hand, if the receive data is decided to be a user process cancel code (YES at step S123), the USER flag is reset to be "0" (step S124), and the bit of the user process is reset in the request vector (step S125). Then, the flow returns to the main flow.

(e) modified embodiment

In a modified embodiment of the present invention, landscape mode is designated if the area of image data received from the host is decided to be larger than the maximum width in which the printer can print in the portrait mode. In this embodiment, the UT-buffer 312 is not needed, and in the flow of a user process shown in FIG. 12(b), the steps S513–S515 are omitted. In this embodiment, the parameter RIGHTMAX expresses the maximum width in which the printer can print an image. Therefore, in the step S603, it is decided if the parameter of the right margin set command exceeds the maximum width RIGHTMAX in which the printer can print an image, and the landscape designation command or portrait designation command is sent to the UR-buffer 306 according as the decision is YES or NO (step S604 and S605). Therefore, the landscape mode is adopted automatically according to the image width set by an application program.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

I claim:

1. An apparatus for forming an image according to image data received from an external source on a sheet of paper having a predetermined width that corresponds to a maximum width on which the image can be printed, comprising:
   (a) memory means for storing a page of image data;
   (b) writing means for writing the image data received from the external source in said memory means in a first mode so that a direction of an image in said memory means agrees with a direction of an image received from the external source if a width of the image received from the external source is not larger than the predetermined width;
   (c) said writing means including means for writing the image data received from the external source in said memory means in a second mode so that a direction of an image to be stored in a second mode so that a direction of an image to be stored in said memory means is different from the direction of the image received from the external source is larger than the predetermined width; and
   (d) image forming means for forming an image on the sheet of paper according to the image data written in said memory means.

2. An apparatus according to claim 1, wherein said predetermined width is a maximum width in which an image can be formed.

3. An apparatus according to claim 1, wherein said predetermined width is the width of the sheet of paper on which the image is printed.

4. An apparatus according to claim 1, further comprising size detection means for detecting a size of the sheet of paper on which the image is to be formed; wherein, said predetermined width is the width of the sheet of paper detected by said size detection means.

5. An apparatus according to claim 1, wherein said writing means writes the image in said memory means in said second mode so that the direction of the image to be stored in said memory means is perpendicular to the direction of the image received from the external source.

6. An apparatus for forming an image according to image data received from an external source on a sheet of paper having a predetermined width that corresponds to a maximum width on which the image can be printed, comprising:
   (a) memory means for storing a page of image data;
   (b) writing means for writing the image data received from the external source in said memory means in a first mode so that a direction of an image to be stored in said memory means agrees with a direction of an image received from the external source if a width of the image received from the external source is not larger than the predetermined width;
   (c) said writing means including means for writing the image data received from the external source in said memory means in a second mode so that a direction of an image to be stored in said memory means is different from the direction of the image received from the external source if the width of the image received from the external source is not larger than the predetermined width;
   (d) determination means for determining in which of said first and second modes the image data received form the external source is stored in said memory means based on whether the width of the image data is larger than the predetermined width or not; and
   (e) image forming means for forming an image on the sheet of paper according to the image data stored in said memory means.

7. An apparatus for forming an image according to image data received from an external source on a sheet of paper having a predetermined width that corresponds to a maximum width on which the image can be printed, comprising:
   (a) memory means for storing a page of image data;
   (b) writing means for writing the image data received from the external source in said memory means in a first mode so that a direction of an image to be stored in said memory means agrees with a direction of an image received from the external source if a width of the image received from the external source is not larger than the predetermined width;
   (c) said writing means including means for writing the image data received from the external source in said memory means in a second mode so that a direction of an image to be stored in said memory means is different from the direction of the image received from the external source if the width of the image received from the external source is not larger than the predetermined width;
   (d) control means for controlling said writing means so as to write the image data in said memory means in said first mode if the width of the image received from the external source is not larger than the predetermined width, and for controlling said writing means so as to write the image data in said memory means in said second node if the width of the image received from the external source is larger than the predetermined width; and
   (e) image forming means for forming an image on the sheet of paper according to the image data stored in said memory means.

8. An apparatus according to claim 7, wherein said predetermined width is a maximum width in which an image can be formed.

9. An apparatus according to claim 7, wherein said predetermined width is the width of the sheet of paper on which the image is printed.

10. An apparatus according to claim 7, further comprising size detection means for detecting a size of the sheet of paper; wherein said predetermined width is the width of the sheet of paper detected by said size detection means.

11. An apparatus for forming an image according to image data received from an external source on a sheet of paper having a predetermined width that corresponds to a maximum width on which the image can be printed, comprising:
   (a) memory means for storing a page of image data;
   (b) storing writing means for writing the image data received from the external source in said memory means in a first node if a width of the image received from the external source is not larger than the predetermined width;
   (c) said writing means further including means for writing the image data received from the external source in said memory means in a second mode so that a longer direction different from a first direction in which an image is written by said writing means in the first mode if the width of the image received from the external source is not larger than the predetermined width; and
   (d) image forming means for forming an image on the sheet of paper according to the image data written in said memory means by said writing means.

12. An apparatus according to claim 11, wherein the first direction is perpendicular to the second direction.

13. An apparatus according to claim 11, wherein the width of the image received from the external source is the width of a sheet of paper in the second direction.

14. An apparatus according to claim 11, wherein said predetermined width is the maximum width in which an image can be formed.

15. An apparatus according to claim 11, wherein said predetermined width is of the width of a sheet of paper on which the image is printed.

16. An apparatus for forming an image according to image data received from an external source on a sheet of paper having a predetermined width that corresponds to a maximum width on which the image data can be printed, comprising:
   (a) memory means for storing a page of image data;
   (b) image forming means for forming an image on the sheet of paper according to the image data stored in said memory means; and
   (c) write means for writing image data in said memory means so that a direction of an image to be formed on the sheet of paper is rotated if a width of the image data received from the external source is larger than the predetermined width.

17. An apparatus according to claim 16, further comprising size detection means for detecting a size of the sheet of paper; wherein said predetermined width is the width of the sheet of paper detected by said size detection means.

18. An apparatus according to claim 16, wherein said predetermined width is a maximum in which an image can be formed.

19. An apparatus for forming an image from a sheet of paper carried in a subscan direction by scanning the sheet in a main scan direction according to image data received from an external source onto a sheet of recording paper having a predetermined width that corresponds to a maximum width on which the image can be printed, comprising:
   (a) memory means for storing a page of image data;
   (b) writing means for writing the image data received from the external source in said memory means in a first mode so that a longer direction of an image to be stored in said memory means agrees with the main scan direction if a width of the image received from the external source is not larger than the predetermined width;
   (c) said writing means includes means for writing the image data received from the external source in said memory means in a second mode so that the longer direction of the image to be stored in said memory means agrees with the subscan direction if the width of the image received from the external source is not larger than the predetermined width; and
   (d) image forming means for forming an image on the sheet of recording paper according to the image data stored in said memory means by said writing means.

20. An apparatus according to claim 19, wherein said predetermined width is the maximum width in which an image can be formed.

21. An apparatus according to claim 19, wherein said predetermined width is a width of the sheet of paper on which the image is printed.

22. An apparatus according to claim 19, further comprising size detection means for detecting a size of the sheet of paper; wherein said predetermined width is the width of the sheet of paper detected by said size detection means.

23. An apparatus for forming an image on a sheet in paper carried of a subscan direction by scanning the sheet in a main scan direction according to image data received from an external source, comprising:
   (a) memory means for storing a page of image data;
   (b) image forming means for forming an image on a sheet of paper according to the image data stored in said memory means; and
   (c) write means for writing image data received from the external source in said memory means by rotating all of said received image data by 90° if a width of an image received from the external source is larger than a width of the sheet of paper in the main scan direction.

24. An apparatus for forming an image on a sheet of paper carried in a subscan direction by scanning the sheet in a main scan direction according to image data received from an external source, comprising:
   (a) receive means for receiving code data from the external source;
   (b) conversion means for converting the received code data to bit data;
   (c) memory means for storing the bit data;
   (d) image forming means for forming an image on a recording sheet of paper according to the bit data stored in said memory means;
   (e) first detection means for detecting a size of the image received from the external source;
   (f) second detection means for detecting a size of the recording sheet of paper; and
   (g) write means for writing the bit data in said memory means by rotating a direction of the image to be formed on the sheet of recording paper if the size of the image in the main scan direction detected by said first detection means is larger than the size of the sheet of recording paper detected by said second detection means.

25. An apparatus according to claim 24, wherein said write means write the bit data in said memory means by rotating the direction of all the bit data automatically by 90° if the size of the image in the main scan direction detected by said first detection means is larger than the size of the sheet of paper detected by said second detection means.

26. An apparatus for forming an image on a sheet of paper carried in a subscan direction by scanning the sheet in a main scan direction according to image data received from an external source, comprising:
   (a) receive means for receiving code data from the external source;
   (b) conversion means for converting the received code data to bit data;
   (c) memory means for storing the bit data;
   (d) write means for writing the bit data in said memory means;
   (e) read means for reading the bit data from said memory means;
   (f) image forming means for forming an image on a sheet of recording paper according to the bit data stored in said memory means; and
   (g) control means for controlling said write and read means so that a direction of the image received by said receive means becomes perpendicular to a direction of an image formed by said image forming means if a size in the main scan direction of the image received from the external source is larger than a size in the main scan direction of the sheet of recording paper.

27. An apparatus for forming an image according to image data received from an external source on a sheet of paper having a predetermined width that corresponds to a maximum width on which the image can be printed, comprising
   (a) memory means for storing a page of image data;
   (b) write means for writing the image data received from the external source in said memory means so that a direction of an image to be stored in said memory means is different from a direction of an image to be received from the external source if a width of an image to be received from the external is larger than the predetermined width; and
   (c) image forming means for forming an image on the sheet of paper according to the image data written in said memory means by said write means.

28. An apparatus according to claim 27, wherein said predetermined width is the maximum width in which an image can be formed.

29. An apparatus according to claim 27, wherein said predetermined width is the width of the sheet of paper on which the image is printed.

30. An apparatus according to claim 27, wherein said write means writes an image in said memory means so that a direction of an image to be stored in said memory means is perpendicular to a direction of an image to be received from the external source.

* * * * *

UNITED STATES PATENT AND TRADEMARK OFFICE
CERTIFICATE OF CORRECTION

PATENT NO. : 5,220,431
DATED : June 15, 1993
INVENTOR(S) : Ikunori Yamaguchi

It is certified that error appears in the above-indentified patent and that said Letters Patent is hereby corrected as shown below:

On the title page, items [19] and [75], delete "Yamagguchi" and insert --Yamaguchi--.

On the title page, item [54] and col. 1, line 3, delete "PORTRAIL" and insert --PORTRAIT--.

Signed and Sealed this

Eleventh Day of January, 1994

Attest:

BRUCE LEHMAN

Attesting Officer

Commissioner of Patents and Trademarks